United States Patent [19]
Tuminello et al.

[11] Patent Number: 5,696,195
[45] Date of Patent: Dec. 9, 1997

[54] SOLUTIONS OF PERFLUORINATED POLYMERS IN $SF_6$ WITH OR WITHOUT $CO_2$

[75] Inventors: William Howard Tuminello, Newark, Del.; Mark A. McHugh; Cynthia Asli Mertdogan, both of Baltimore, Md.

[73] Assignees: E. I. Du Pont de Nemours and Company, Wilmington, Del.; Johns Hopkins University, Baltimore, Md.

[21] Appl. No.: 657,294

[22] Filed: Jun. 4, 1996

[51] Int. Cl.⁶ .................................................. C08K 3/30
[52] U.S. Cl. ..................... 524/419; 524/418; 524/546; 525/326.1; 525/326.4; 525/345; 525/354; 525/388; 528/483; 528/487; 528/490; 528/503
[58] Field of Search ............................. 524/418, 419, 524/546; 525/326.1, 326.4, 345, 354, 388; 528/483, 487, 490, 503

[56] References Cited

U.S. PATENT DOCUMENTS

| | | | |
|---|---|---|---|
| 3,876,589 | 4/1975 | Wasley et al. | 525/354 X |
| 5,264,536 | 11/1993 | Radosz | 528/483 |
| 5,403,882 | 4/1995 | Huggins | 524/419 X |
| 5,530,049 | 6/1996 | Dee et al. | 528/483 X |

FOREIGN PATENT DOCUMENTS

| | | | |
|---|---|---|---|
| 42 04 176 | 8/1993 | Germany | B29B 17/02 |
| WO 93/20116 | 10/1993 | WIPO | C08F 14/18 |

OTHER PUBLICATIONS

DeSimone, J.M. et al, "Synthesis of Fluoropolymers in Supercritical Carbon Dioxide", *Science*, 257, 945–947 (1992).

McHugh, M. et al, "Supercritical Fluid Extraction Principles and Practice", *Butterworths Boston*, Chapter 9, pp. 156–163 (1986).

Smith, P. et al, "Dissolution of Poly(tetrafluoroethylene)", *Macromolecules*, 1222–1227 (1993).

McHugh, M. et al, *Encyclopedia of Polymer Science & Engineering*, 16, 368–399 (1985).

JP 50–49806 (Abstract), *Derwent Publications Ltd.*, London, AN–93–111979[14], Mar. 2, 1993.

JP 50–49806 (Abstract), *Patent Abstracts of Japan*, vol. 17, No. 355; Jul. 6, 1993.

*Primary Examiner*—Judy M. Reddick

[57] ABSTRACT

Perfluorinated polymers are dissolved in supercritical carbon dioxide and/or sulfur hexafluoride at elevated temperatures and pressures. The solutions are useful for making foams, spun-bonded or paper-like webs, or for purification of polymers.

23 Claims, 6 Drawing Sheets

SOLUTIONS OF PERFLUORINATED POLYMERS IN $SF_6$ WITH OR WITHOUT $CO_2$

FIELD OF THE INVENTION

Disclosed herein are solutions of perfluorinated polymers dissolved in supercritical carbon dioxide or sulfur hexafluoride. Also disclosed are processes for making these solutions.

TECHNICAL BACKGROUND

It is well known that perfluorinated polymers, particularly such perfluorinated polymers which melt at higher temperatures, are difficult to dissolve in solvents, and solvents for such perfluorinated polymers are typically perhalogenated, often perfluorinated, organic compounds. Such compounds are relatively expensive, sometimes toxic, and believed to be "greenhouse gases". Cheaper, more benign solvents are therefore desired. It has now been found that such perfluorinated polymers dissolve in supercritical $CO_2$ (carbon dioxide) or $SF_6$ (sulfur hexafluoride) under specified conditions, which depend in part on the melting point of the polymer.

J. M. DeSimone et al., Science, vol. 257, p. 945–947 (1992) describes solutions of hydrofluorocarbon polymers in supercritical $CO_2$. Solutions of perfluoropolymers are not made.

In M. McHugh et al., Supercritical Fluid Extraction Principles and Practice, Butterworths, Boston, 1986, chapter 9, pages 156–163, it is reported that low molecular weight poly(hexafluoropropylene oxide) and low molecular weight poly(chlorotrifluoroethylene) dissolve in supercritical carbon dioxide. Both of these polymers are low molecular weight, and are oils (noncrystalline) at room temperature.

SUMMARY OF THE INVENTION

This invention concerns a composition comprising a perfluorinated tetrafluoroethylene polymer with a melting point of about 175° C. or more, dissolved in supercritical $CO_2$.

This invention also concerns a process for dissolution of perfluorinated tetrafluoroethylene polymer comprising, contacting a perfluorinated tetrafluoroethylene polymer with supercritical $CO_2$ at a temperature and a pressure sufficient to ensure complete miscibility of said perfluorinated tetrafluoroethylene polymer and said $CO_2$ at all proportions, provided that said perfluorinated tetrafluoroethylene polymer has a melting point of about 175° C. or more.

Disclosed herein is a composition, comprising, a perfluorinated polymer dissolved in a solvent comprising sulfur hexafluoride.

Also disclosed herein is a process for dissolution of a perfluorinated polymer, comprising, contacting said perfluorinated polymer with a solvent comprising sulfur hexafluoride, at a temperature and pressure sufficient to ensure completely miscibility of said perfluorinated polymer with said solvent.

DETAILS OF THE INVENTION

In all the descriptions below, each preferred condition or composition is applicable to both the process of dissolving the polymer and the polymer solution itself, when appropriate.

The polymer used herein may be a perfluorinated tetrafluoroethylene polymer. By this is meant that at least some of the repeat units, preferably about 10 mole percent, more preferably at least about 50 mole percent, and especially preferably at least 75 mole percent, of the repeat units in the polymer are derived from tetrafluoroethylene (TFE), i.e., —$CF_2CF_2$—. Thus this polymer is a homo- or copolymer of TFE. If the polymer is a copolymer, the comonomers of which it is composed are all perfluorinated. Preferred comonomers are perfluoro(propyl vinyl ether), hexafluoropropylene, and perfluoro(methyl vinyl ether). Hexafluoropropylene and perfluoro(propyl vinyl ether) are especially preferred comonomers. Another preferred polymer is the TFE homopolymer, polytetrafluoroethylene (PTFE).

The polymers used herein may have a melting point of about 175° C. or more, preferably about 200° C. or more, and more preferably about 250° C. or more. The melting point used herein is measured by differential scanning calorimetry (DSC) using ASTM method D3418-82, with the following exceptions. The heating rate is 10° C./min. About 10 mg of polymer, which has been quenched from the melt, is used. The melting point is measured by drawing a straight line from the baseline just at the onset of the melting endotherm, to the baseline just at the end of the melting endotherm. The melting point is taken as the point at which the straight line intersects with the experimental plot at the end of the melting endotherm. Thus, the melting point used herein corresponds to the temperature of the melting point of the highest melting fraction of the polymer, under the test conditions.

The polymers herein may be dissolved in supercritical $CO_2$ alone ($CO_2$ is the only solvent). The critical temperature of $CO_2$ is 31° C., but much higher temperatures, usually above 100° C. are needed. This is because the polymers to be dissolved in pure $CO_2$ have such high melting points, and because these melting points are pressure dependent. Thus as the pressure is raised, the melting points of the polymers increase. Therefore, the temperature required for dissolution will sometimes rise as the pressure on the system is increased, particularly when the mount of $CO_2$ in the mixture is relatively low. Generally, the pressure required to cause dissolution of the polymer is about 80 MPa or more, preferably about 90 MPa or more, and more preferably about 100 MPa or more. Lower melting or amorphous perfluorinated polymers may also be dissolved in supercritical $CO_2$ alone, but generally also require elevated temperatures, for instance about 180° or more.

Other lower boiling compounds such as, but not limited to, $SF_6$, $N_2O$, $N_2$ and Ar may also act as solvents for the instant polymers under similar supercritical conditions.

By dissolution herein is meant dissolving the polymer under conditions in which the polymer and $CO_2$ or $SF_6$ are miscible in all proportions. While the dissolution may start under conditions that are not sufficient for complete dissolution, as in the early stages of heating and or pressurizing the apparatus used, the process should at least pass through conditions (temperature and pressure) under which the $CO_2$ or $SF_6$ and polymer are completely miscible in all proportions. It is most convenient to maintain the solution at such conditions, although the solution can also be maintained at any conditions under which that particular polymer at that particular concentration in $CO_2$ or $SF_6$ remains miscible.

The solutions made herein are useful for making foams (by lowering the pressure on the solution, preferably in a controlled manner), and spun-bonded or paper-like webs (see U.S. Pat. No. 4,052,625). Polymer may also be purified (separated from inorganic or other insoluble materials) by dissolution of the polymer and filtration of the solution (under conditions at which the polymer remains soluble).

It is preferred that the ingredients be agitated in some way while the polymer is dissolving. Agitation will increase the rate of the dissolution process. The rate at which the polymer dissolves also depends upon the concentration of polymer desired in the $CO_2$ or $SF_6$ solution, and the molecular weight of the polymer. The higher the concentration and/or the higher the polymer molecular weight, the slower the polymer will dissolve.

Figure 1:
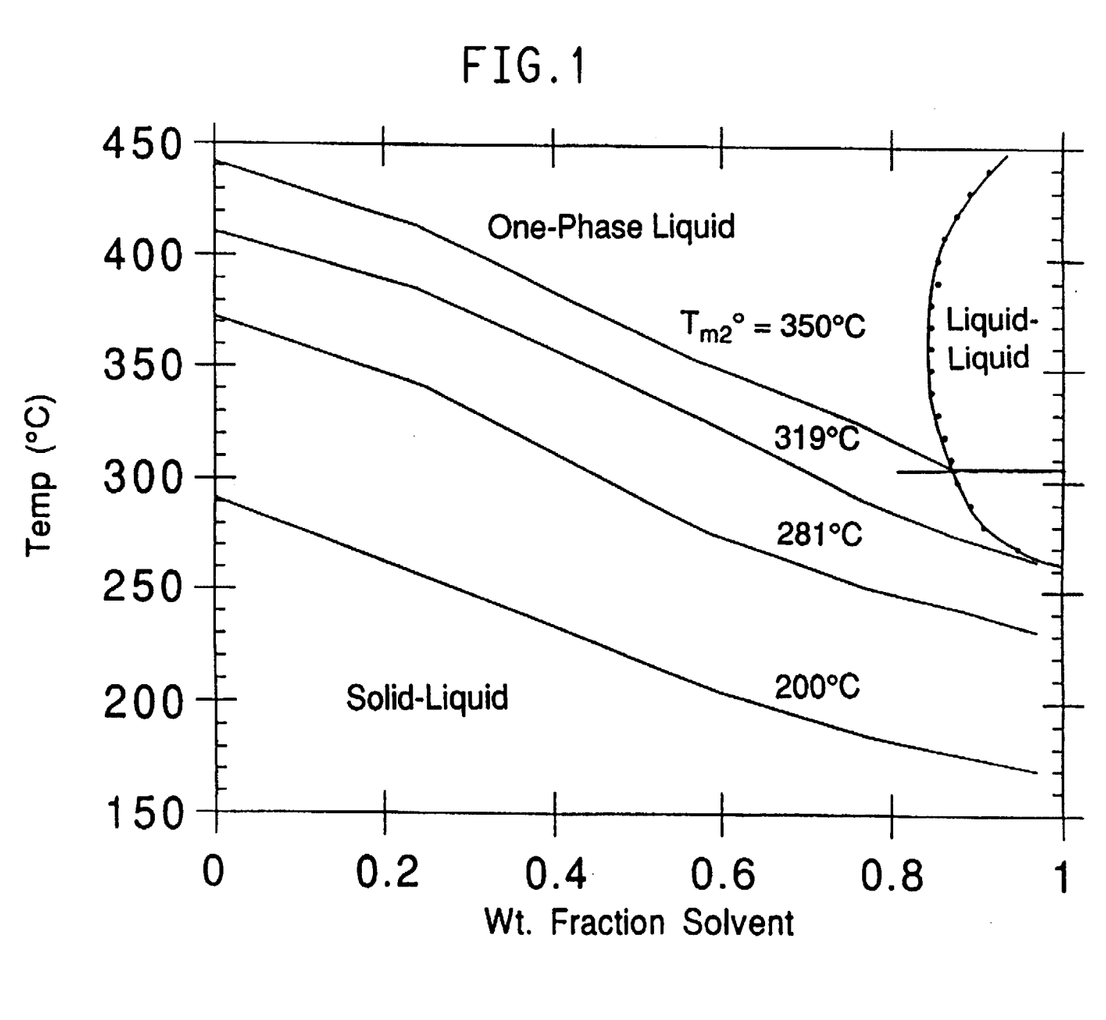
FIG. 1 is a calculated phase diagram for perfluorinated tetrafluoroethylene polymers in supercritical $CO_2$ at 92 MPa.
Figure 2:
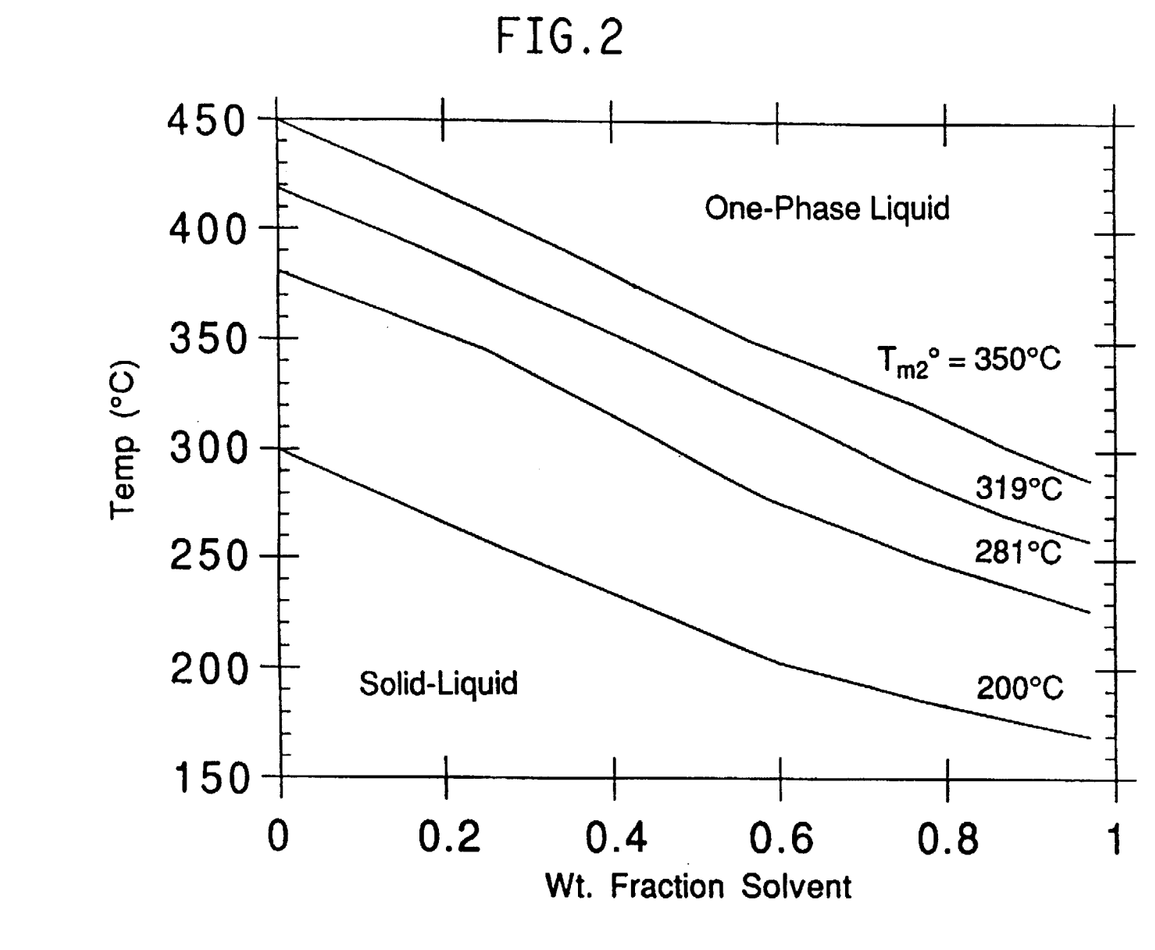
FIG. 2 is a calculated phase diagram for perfluorinated tetrafluoroethylene polymers in supercritical $CO_2$ at 100 MPa.

Included herein are FIGS. 1 and 2, which are calculated phase diagrams for the instant perfluorinated tetrafluoroethylene polymers in supercritical $CO_2$, at 92 MPa and 100 MPa respectively. These calculated phase diagrams were determined in the following way. The Flory-Huggins Theory (see P. J. Flory, Principles of Polymer Chemistry, Cornell University Press, Ithaca, N.Y., 1953, p. 568) was used to predict the liquidus curve (melting point depression). For this calculation a minimum value of 0.34 for the polymer-solvent interaction parameter was used, when $CO_2$ molar volume was less than about 55 $cm^3$/mole.

The Sanchez and Lacombe equation-of-state theory [I. C. Sanchez, et al., J. Phys. Chem., vol. 80, p. 2352 (1976)] was used according to methodology outlined by Sanchez (see I. C. Sanchez in K. A. Meyers, Ed., Encyclopedia of Physical Science and Technology, vol. 11, p. 1–18, 1987). PVT data for PTFE [see P. Zoller, J. Appl. Polym. Sic., vol. 22, p. 633 (1978)] were used to obtain the appropriate reduction factors, which were used at all temperatures and for all the polymers. For PTFE itself, and for the other polymers whose phase diagrams are shown in FIGS. 1 and 2, PVT data for PTFE were used, since it was assumed that perfluorinated copolymers will have approximately the same atmospheric pressure density and PVT relationships as PTFE. All other data needed (such as that for $CO_2$) was obtained fore the literature.

All of these calculations were used to generate FIGS. 1 and 2. These Figures are phase diagrams, differing only in the fact that FIG. 1 is a diagram of the $CO_2$-perfluorinated tetrafluoroethylene polymer system at a pressure of 92 MPa, while FIG. 2 is at 100 MPa. As noted, the horizontal axis represents the weight fraction of $CO_2$, while the vertical axis is temperature in °C. The four almost straight lines in each plot running approximately diagonally from upper left to lower right each represents a (co)polymer, either PTFE (top line) or the melting point of a copolymer (the lowest line of the four represents the polymer used in Examples 1 and 2). The area above each of these lines represents a single phase liquid (a solution) of $CO_2$ and that particular polymer, while the area below each line represent two phases, a solid (polymer) and liquid ($CO_2$ plus polymer). In FIG. 1, the circular area in which L-L appears represents conditions under which two liquid phases occur. This circular area, and the area below the diagonal line for each polymer represent conditions in which each of the polymers is not totally miscible with $CO_2$ in all proportions.

The approximate combinations of temperature and pressure which are required for complete miscibility of a perfluorinated tetrafluoroethylene polymer at 92 MPa and 100 MPa are shown in these two Figures. These are approximations (because of the assumptions and approximations made in the calculations) of the conditions required for dissolving any particular polymer, and serve as a guide, so that very little experimentation is needed to determine the conditions of temperature and pressure needed to dissolve any particular polymer. Approximately correct conditions were predicted by these diagrams for the dissolution of the polymer of Examples 1 and 2.

Similarly, as mentioned above, supercritical sulfur hexafluoride, $SF_6$, may also be used to dissolve amorphous or crystalline perfluorinated polymers. All perfluorinated polymers may be dissolved, but it is preferred that the perfluorinated polymer have a melting point of about 175° C. or more, more preferably about 200° C. or more, and especially preferably about 250° C. or more. It is preferred that the polymer is a perfluorinated tetrafluoroethylene polymer. However, for $SF_6$, this type of polymer may be amorphous, have a low melting point, or have the higher melting properties described above.

Figure 4:
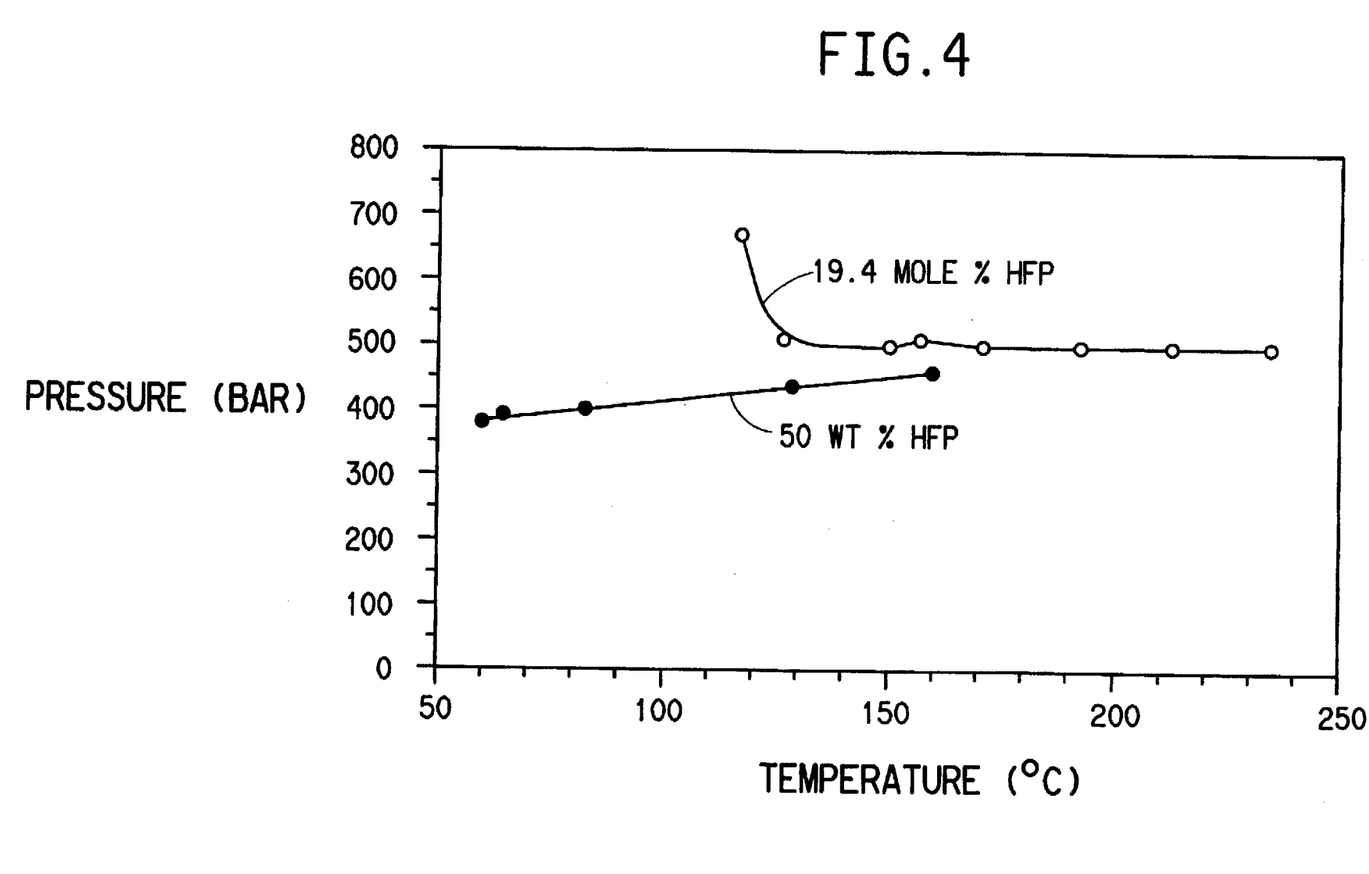
FIG. 4 shows a phase diagram, represented by the line with solid cirles, for a polymer containing 50 weight percent hexafluoropropylene and 50 weight percent tetrafluoroethylene that was tested for solubility in $SF_6$ while the line with the open circles is a phase diagram for a polymer containing 19.4 mole percent hexafluoropropylene and 80.6 mole percent tetrafluoroethylene.
Figure 5:
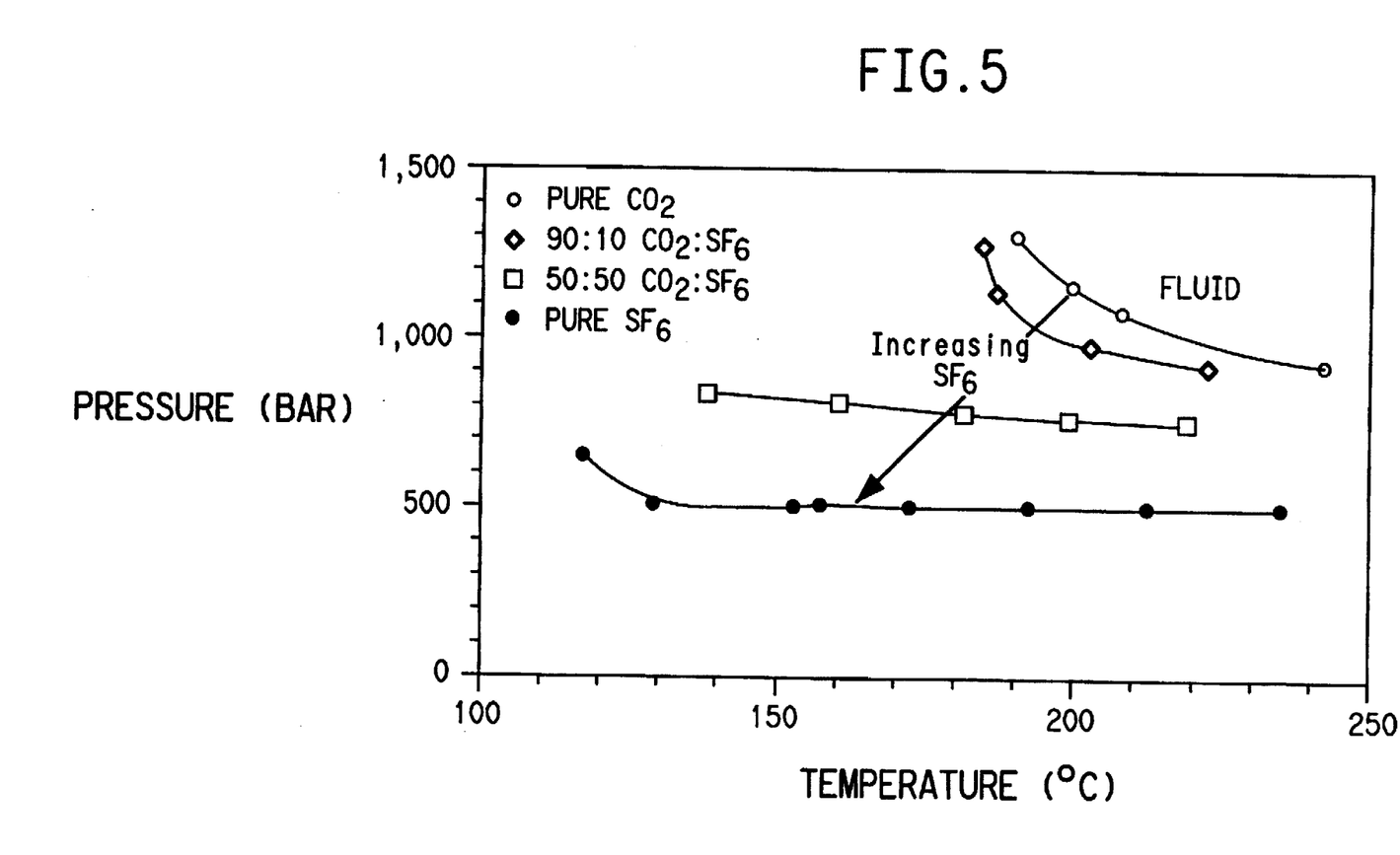
FIG. 5 shows a phase diagram in which a mixture having differing weight ratios of $SF_6$ and $CO_2$ is present as a solvent.

The same types of calculations which are applicable to $CO_2$ are also applicable to $SF_6$. The critical temperature of $SF_6$ is 45.5° C. When pure $SF_6$ is used as the solvent, it is preferred that the pressure is about 36 MPa or more during the dissolution process, and to keep the polymer in $SF_6$ solution. FIGS. 4 and 5 are phase diagrams with pure $SF_6$ and mixtures of $SF_6$ and $CO_2$, respectively, as the solvents.

Figure 6:
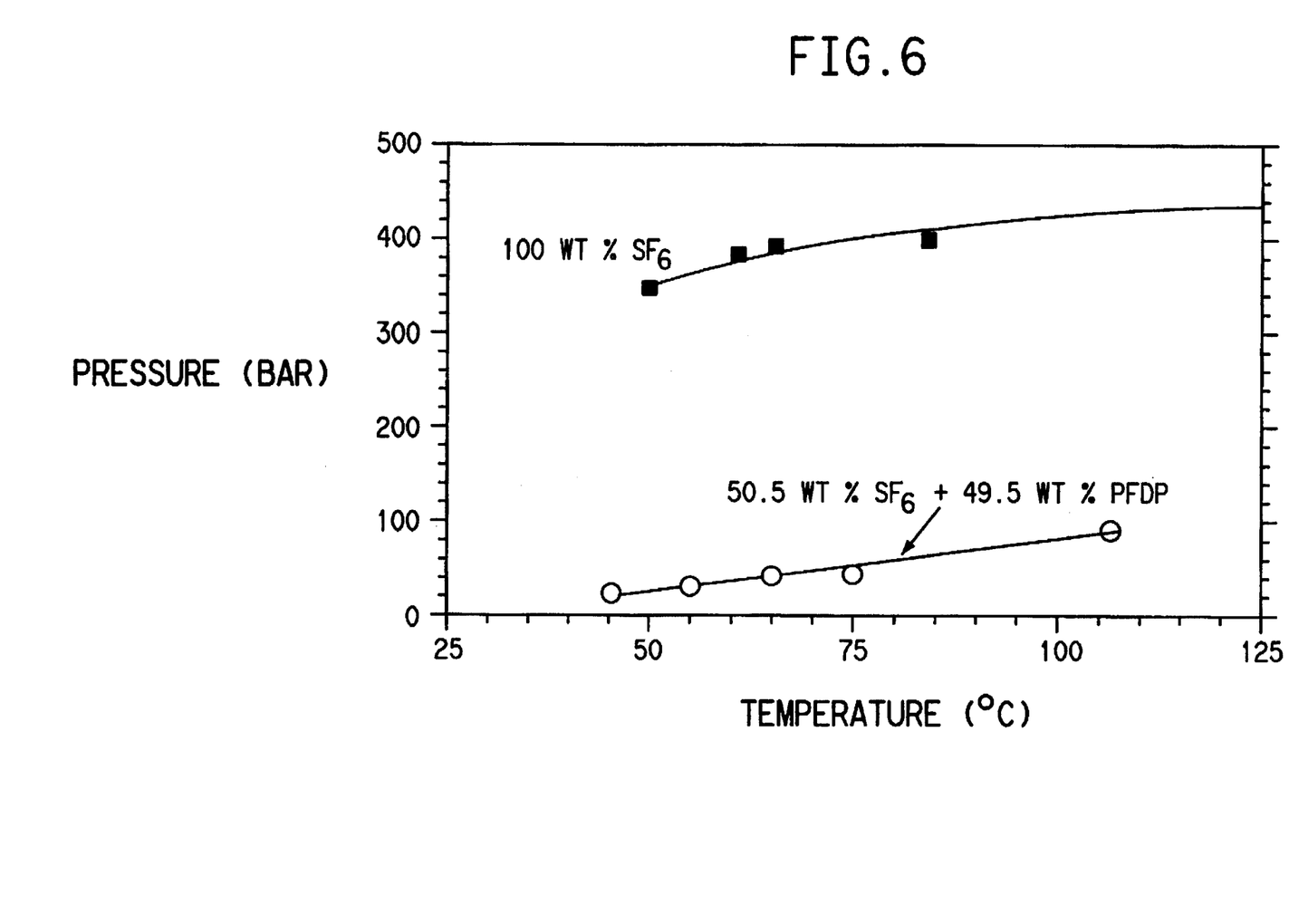
FIG. 6 shows the phase diagram for a solvent mixture of $SF_6$ and perfluorodecahydrophenanthrene and a perfluorinated polymer containing 50 weight percent hexafluoropropylene and 50 weight percent tetrafluoroethylene.

It is believed that generally speaking, and especially for amorphous or lower melting perfluorinated polymers, lower pressures and/or temperatures are required for $SF_6$ than for $CO_2$. Additionally, it has also been found that if $SF_6$ is part of the solvent system for a perfluorinated polymer with other supercritical fluids, such as $CO_2$ the temperature and/or pressure required to dissolve the polymer is considerably reduced over that for the second solvent such as $CO_2$. A preferred cosolvent with $SF_6$ is $CO_2$. A cosolvent need not be a supercritical fluid. Mixtures of $SF_6$ and noncritical cosolvents may be advantageous if the cosolvent is especially expensive and $SF_6$ may act as a less expensive diluent. Suitable cosolvents as noncritical cosolvents are perfluorinated hydrocarbons, and perfluorodecahydrophneanthrene ($C_{14}F_{24}$) is a preferred cosolvent. When cosolvents are used, by supercritical is meant a temperature above the critical point of pure $SF_6$. FIG. 6 shows the phase diagram for a solvent mixture of $SF_6$ and perfluorodecahydrophenanthrene and a perfluorinated polymer containing 50 weight percent hexafluoropropylene and 50 weight percent tetrafluoroethylene.

General Procedure

A copolymer of tetrafluoroethylene containing 19.3 mole % hexafluoropropylene (HFP) was used in the Examples because the apparatus could not be heated above 250° C. The shear viscosity for this polymer's melt at 372° C. was measured as 1200 Pa.s at a shear stress of 44,800 Pa. Its melting point by DSC (as previously described) was about 200° C.

Figure 3A:
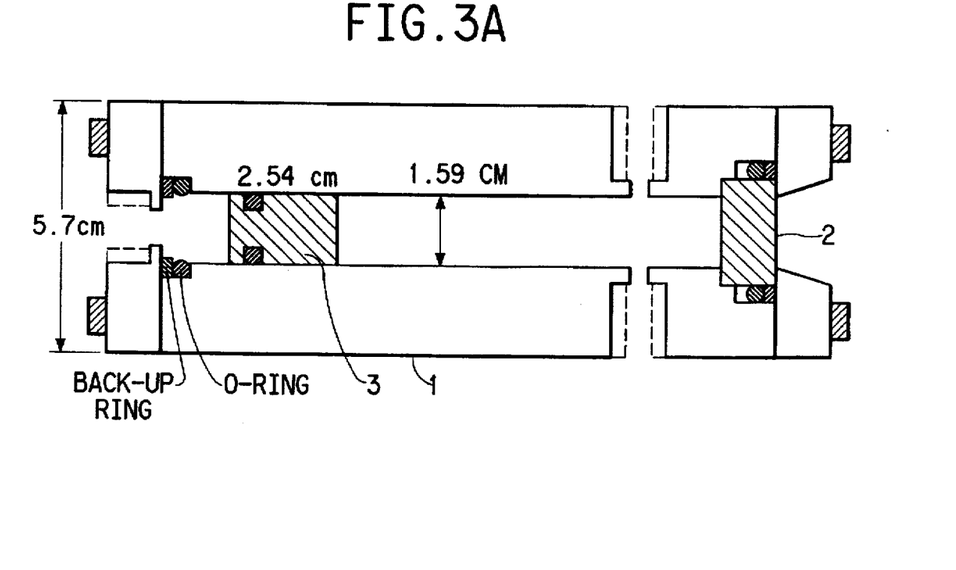
FIG. 3 is a schematic drawing of the variable-volume cell and auxiliary equipment used in the dissolution studies discussed herein.
Figure 3B:
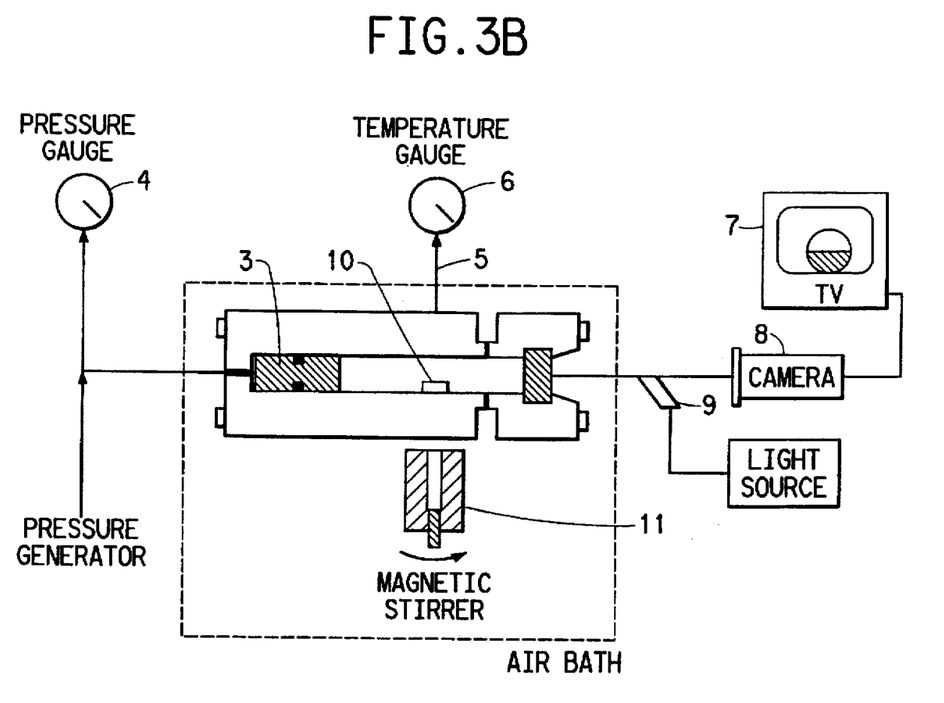

A schematic of the high pressure variable-volume cell and auxiliary equipment used in the dissolution studies is shown in FIG. 3. The cell (1), is fitted with a 1.9 cm thick sapphire window (2) to allow visual observation of the phases. By moving a piston (3) located within the cell, a polymer-solvent mixture is compressed to the desired pressure as measured by a Heise guage (4) (Dresser Industries, Model CM-108952, 0–3450 ±13.5 bar). The temperature of the cell is measured to within 0.4° C. using a platinum resistance thermometer (5) (Thermometrics Corp., Class A) and a digital multimeter (6) (Keithley Instruments, Inc. Model 195T, accuracy ±0.03%). The mixture inside the cell is viewed with a video monitor (7) using a camera (8) coupled to a horoscope (9) placed ourside the sapphire window (2). The solution in the cell is mixed with a stir bar (10) activated by an external magnet (11) located beneath the cell. Solubility measurements are made while the cell is heating starting from room temperature.

The described apparatus is capable of holding 276 MPa (40,000 psi) pressure at 250° C. while enabling the viewing of solubility behavior. Agitation via a magnetic stirrer was used. The apparatus and its operation are described in Meilchen et al., *Macromolecules*, volume 24, p. 4874 (1991). The apparatus was charged with polymer and $CO_2$ and/or $SF_6$ at room temperature. A band heater (no shown), fitted around the piston-cell arrangement, provided the main source of heat. All observations were made while the apparatus was heating from room temperature.

The cell was purged with nitrogen at 30 to 50 bar, and then with the solvent being used at 3–6 bar. About 8 to 16 g of solvent is added to a cell which contained about 0.3 to 0.7 g polymer. The system pressure was measured at ±2.8 bar, and the temperature maintained at ±0.2° C. below 200° C., and ±0.4° C. above 200° C. The cloud point pressure is defined as the point at which the solution becomes so opaque that it is no longer possible to see the stir bar inside the cell.

EXAMPLE 1

Copolymer (0.2 g) plus 15.98 grams of $CO_2$ was added to the apparatus described above. Near room temperature, the powdered polymer was quite visible as fluffy powder which quickly settled after agitation. The first evidence of any swelling was observed at about 125° C., 121 MPa, at which point the particles settled much more slowly. At 215° to 225° C., complete dissolution occurred with the exception of a small amount of cloudiness. An EPDM 'O' ring was used but failed near 225° C. allowing water into the cell.

EXAMPLE 2

Copolymer (1.022 g) was added with 17.034 grams of $CO_2$ to the apparatus described above. Near room temperature, the powdered polymer was quite visible as fluffy powder which quickly settled after agitation. The first evidence of any swelling was observed at about 146° C., 110 MPa, at which point the particles remained suspended in the liquid. Swelling and coalescence followed by elongation of the polymer-rich phase was observed when agitated at about 165° C., 110 MPa. These elongated strands of swollen polymer then appeared to dissolve into the more mobile $CO_2$-rich phase. Evidence that dissolution had actually occurred came in the form of observing a cloud point in the $CO_2$-rich phase upon dropping the pressure to about 90 MPa. This cloud point represents the pressure at which complete opacity was observed. The change from complete transparency to opacity occurred gradually over a broad pressure range from about 110 to 90 MPa. At about 215° C., a homogeneous, low viscosity, but slightly cloudy liquid was obtained. The cloud point was now about 131 MPa. The cloudiness could have been due to a small component of high TFE content homopolymer requiring higher temperatures for dissolution. It could also have been due to small amounts of insolubles leached from the 'O' ring seals. The Viton® 'O' rings used in this example swelled enormously in $CO_2$. Pressures and temperatures as high as 193 MPa and 225° C. were employed in an unsuccessful effort to render the liquid completely transparent.

The first observance of polymer dissolving in the $CO_2$ at 165° C. is quite close to our prediction of about 170° C. The cloud point at this temperature was observed to be about 90 MPa, also close to the predicted behavior. The broad range of temperature and pressure over which solubility was observed indicates a wide range in polymer composition.

EXAMPLE 3

The polymer containing 19.3 mole percent hexafluoropropylene (about 0.8 g) was dissolved in $SF_6$ (about 16 g) using the above procedure. The phase diagram for this polymer in $SF_6$ is shown in FIG. 4, with the line with the open circles representing this polymer. As with the $CO_2$ solution above, the area above and to the right of this line represents true solution.

A second polymer (about 0.8 g) containing 50 weight percent hexafluoropropylene and 50 weight percent tetrafluoroethylene, and which was amorphous, was also tested for solubility in $SF_6$ (about 16 g). The phase diagram for this system is also shown in FIG. 4, represent by the line with the solid circles. The area above this line represents conditions for solution.

EXAMPLE 4

The polymer containing 19.3 mole percent hexafluoropropylene (about 0.77 g) was dissolved in mixtures of $CO_2$ and $SF_6$ using the above procedure. A phase diagram is shown in FIG. 5, in which differing weight ratios of $SF_6$ and $CO_2$ are present, as indicated on the Figure. Areas above and to the right of the various lines shown represent conditions for solution.

EXAMPLE 5

The polymer containing 50 weight percent hexafluoropropylene (see Example 3) was dissolved in mixtures of $SF_6$ and perfluorodecahydrophenathrene (PFDP). The concentration of the polymer in these mixtures was about 2.6 weight percent. FIG. 6 shows the phase diagram for this system, and the phase diagram for this polymer dissolved in pure $SF_6$. Note that much lower pressures are required when the PFDP is present. Areas below each line of FIG. 6 represent conditions under which more than one phase is present, while areas above the lines are one phase.

We claim:

1. A composition, comprising, a perfluorinated tetrafluoroethylene polymer dissolved in a solvent comprising supercritical sulfur hexafluoride.

2. A composition according to claim 1 wherein the perfluorinated polymer is polytetrafluoroethylene polymer.

3. A composition according to claim 1 wherein the perfluorinated tetrafluoroethylene polymer is a copolymer of tetrafluoroethylene and one or more additional comonomers.

4. A composition according to claim 3 wherein said one or more additional comonomers are selected from the group consisting of perfluoro(propyl vinyl ether), hexafluoropropylene, and perfluoro(methyl vinyl ether).

5. A composition according to claim 4 wherein said one or more additional comonomers are selected from the group consisting of hexafluoropropylene and perfluoro(propyl vinyl ether).

6. A composition according to claim 1 wherein the melting point of the perfluorinated polymer is about 175° C. or more.

7. A composition according to claim 6 wherein the melting point of the perfluorinated polymer is about 200° C. or more.

8. A composition according to claim 7 wherein the melting point of the perfluorinated polymer is about 250° C. or more.

9. A composition according to claim 1 wherein said solvent contains at least one compound in addition to said sulfur hexafluoride.

10. A composition according to claim 9 wherein said solvent also additionally comprises carbon dioxide.

11. A composition according to claim 1 wherein said perfluorinated polymer is amorphous.

12. A composition according to claim 9 wherein said compound is a perfluorinated hydrocarbon.

13. A process for dissolution of a perfluorinated tetrafluoroethylene polymer comprising, contacting said perfluorinated tetrafluoroethylene polymer with a solvent comprising supercritical sulfur hexafluoride, at a temperature and pressure sufficient to ensure complete miscibility of said perfluorinated polymer with said solvent.

14. A process according to claim 13 wherein said pressure is about 36 MPa or more.

15. A process according to claim 13 wherein the melting point of the perfluorinated polymer is about 175° C. or more.

16. A process according to claim 13 wherein the melting point of the perfluorinated polymer is about 250° C. or more.

17. A process according to claim 13 wherein the perfluorinated polymer is polytetrafluoroethylene polymer.

18. A process according to claim 13 wherein the tetrafluoroethylene polymer is a copolymer of tetrafluoroethylene and one or more additional comonomers.

19. A process according to claim 18 wherein said one or more additional comonomers are selected from the group consisting of perfluoro(propyl vinyl ether), hexafluoropropylene, and perfluoro(methyl vinyl ether).

20. A process according to claim 13 wherein said perfluorinated polymer is amorphous.

21. A process according to claim 13 wherein said solvent comprises at least one compound in addition to said sulfur hexafluoride.

22. A process according to claim 13 wherein said solvent also comprises carbon dioxide.

23. A process according to claim 21 wherein said compound is a perfluorinated hydrocarbon.

* * * * *